US012032937B2

(12) United States Patent
Ishiguro

(10) Patent No.: US 12,032,937 B2
(45) Date of Patent: Jul. 9, 2024

(54) PROGRAMMING SUPPORT PROGRAM FOR PREVENTING WORK EFFICIENCY FROM LOWERING AS A RESULT OF CONVERSION

(71) Applicant: Mitsubishi Electric Corporation, Tokyo (JP)

(72) Inventor: Natsumi Ishiguro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 90 days.

(21) Appl. No.: 17/797,725

(22) PCT Filed: Mar. 26, 2020

(86) PCT No.: PCT/JP2020/013714
§ 371 (c)(1),
(2) Date: Aug. 5, 2022

(87) PCT Pub. No.: WO2021/129215
PCT Pub. Date: Sep. 30, 2021

(65) Prior Publication Data
US 2023/0065428 A1 Mar. 2, 2023

(51) Int. Cl.
*G06F 8/20* (2018.01)
*G05B 19/05* (2006.01)
(Continued)

(52) U.S. Cl.
CPC ............... *G06F 8/51* (2013.01); *G05B 19/05* (2013.01); *G05B 19/056* (2013.01); *G06N 20/00* (2019.01);
(Continued)

(58) Field of Classification Search
CPC ..... G06F 8/51; G06F 8/34; G06F 8/22; G06F 11/323; G06N 20/00; G05B 19/056; G05B 19/05
See application file for complete search history.

(56) References Cited

U.S. PATENT DOCUMENTS 5,386,569 A   1/1995   Harada et al.
5,905,891 A   5/1999   Harada et al.
(Continued)

FOREIGN PATENT DOCUMENTS

CN   109690426 A   4/2019
JP   5-274011 A    10/1993
(Continued)

OTHER PUBLICATIONS

Daoshan Du et al., A study on the generation of silicon-based hardware Plc by means of the direct conversion of the ladder . . . , Sep. 2008, [Retrieved on Mar. 8, 2024]. Retrieved from the internet: <URL: https://link.springer.com/content/pdf/10.1007/s00170-009-2405-0.pdf> 12 Pages (615-626) (Year: 2008).*
(Continued)

*Primary Examiner* — Anibal Rivera
(74) *Attorney, Agent, or Firm* — XSENSUS LLP

(57) ABSTRACT

A programming support program causes an electronic computer to execute: a first conversion step of converting a first program described in a ladder language into a second program described in an intermediate language; a second conversion step of converting the second program into a third program described in a procedural language; a circuit display component generation step of, when a result of analysis of each block of the second program satisfies a predetermined condition, generating a circuit display component representing a content of a block satisfying the condition; and a display step of displaying the third program and the circuit display component in a format enabling recognition of correspondence between the circuit display component and a block of the third program.

16 Claims, 14 Drawing Sheets

(51) Int. Cl.
    *G06F 8/51*      (2018.01)
    *G06N 20/00*     (2019.01)
    *G06F 8/34*      (2018.01)
    *G06F 11/32*     (2006.01)

(52) U.S. Cl.
    CPC ............. *G06F 8/22* (2013.01); *G06F 8/34* (2013.01); *G06F 11/323* (2013.01)

(56) References Cited

U.S. PATENT DOCUMENTS

| | | | |
|---|---|---|---|
| 10,719,643 | B2 | 7/2020 | Horikawa |
| 2002/0059567 | A1* | 5/2002 | Minamide ............... G06F 8/51 717/151 |
| 2016/0004242 | A1* | 1/2016 | Yamaoka ............ G05B 19/056 700/86 |
| 2016/0034259 | A1 | 2/2016 | Yamaoka et al. |
| 2016/0253445 | A1* | 9/2016 | Pataky ................. G06F 30/327 716/104 |
| 2019/0236233 | A1 | 8/2019 | Horikawa |
| 2021/0165384 | A1* | 6/2021 | Kaneshige .......... G05B 19/056 |
| 2022/0326673 | A1* | 10/2022 | Nagao ................ G05B 19/056 |
| 2023/0011461 | A1* | 1/2023 | Antony .................... G06F 8/35 |

FOREIGN PATENT DOCUMENTS

| | | |
|---|---|---|
| JP | 10-283005 A | 10/1998 |
| JP | 10-340109 A | 12/1998 |
| JP | 2001-22412 A | 1/2001 |
| JP | 2001-195108 A | 7/2001 |
| JP | 2003-84813 A | 3/2003 |
| JP | 2008-293124 A | 12/2008 |
| JP | 2016-224557 A | 12/2016 |
| WO | 2014/136240 A1 | 9/2014 |
| WO | 2014/155717 A1 | 10/2014 |
| WO | 2015/030722 A1 | 3/2015 |
| WO | 2018/051441 A1 | 3/2018 |

OTHER PUBLICATIONS

Office Action mailed Sep. 27, 2023, in Chinese Application No. 202080098862.6, 9 pages.
International Search Report and Written Opinion mailed on Jun. 16, 2020, received for PCT Application PCT/JP2020/013714, filed on Mar. 26, 2020, 10 pages including English Translation.
Notice of Reasons for Refusal mailed on Oct. 6, 2020, received for JP Application 2020-544689, 7 pages including English Translation.
Notice of Reasons for Refusal mailed on Dec. 8, 2020, received for JP Application 2020-544689, 6 pages including English Translation.
Decision to Grant mailed on Feb. 16, 2021, received for JP Application 2020-544689, 5 pages including English Translation.
Chinese Office Action with a full English machine translation (Chinese Application No. 202080098862.6, Date Mailed: Mar. 29, 2023), 31pp.

* cited by examiner

| INPUT | CONTENT |
|---|---|
| INPUT 1 | NUMBER OF CONDITIONS FOR EXECUTING ONE INSTRUCTION |
| INPUT 2 | NUMBER OF INSTRUCTIONS SHARING ONE CONDITION |
| INPUT 3 | NUMBERS OF ANBs, ORBs, MPSs, MRDs, AND MPPs CONSTITUTING CIRCUIT |
| TRAINING DATA | WHETHER TO GENERATE CIRCUIT DISPLAY COMPONENTS |

LADDER PROGRAM NAME, ST PROGRAM NAME,
LD POSITION INFORMATION, PRESENCE OR ABSENCE OF COMPONENT,
COMPONENT NUMBER, ST POSITION INFORMATION
LDProg01, STProg01, 1, TRUE, 1, 1
LDProg01, STProg01, 4, FALSE, -, 15
LDProg01, STProg01, 10, TRUE, 2, 18
LDProg01, STProg01, 15, FALSE, -, 44
      (SNIP)

FIG.18

| CONDITIONAL EXPRESSION | CONTENT |
|---|---|
| ↑ | WHEN SPECIFIED DATA IS SWITCHED FROM OFF TO ON |
| ↓ | WHEN SPECIFIED DATA IS SWITCHED FROM ON TO OFF |
| = | WHEN BEING EQUAL TO COMPARISON VALUE REGARDLESS OF MATCHED/UNMATCHED STATE OF CURRENT VALUE OF MONITORED DATA |
| ≥ | WHEN BEING EQUAL TO OR LARGER THAN COMPARISON VALUE REGARDLESS OF MATCHED/UNMATCHED STATE OF CURRENT VALUE OF MONITORED DATA |
| > | WHEN BEING LARGER THAN COMPARISON VALUE REGARDLESS OF MATCHED/UNMATCHED STATE OF CURRENT VALUE OF MONITORED DATA |
| ≤ | WHEN BEING EQUAL TO OR SMALLER THAN COMPARISON VALUE REGARDLESS OF MATCHED/UNMATCHED STATE OF CURRENT VALUE OF MONITORED DATA |
| < | WHEN BEING SMALLER THAN COMPARISON VALUE REGARDLESS OF MATCHED/UNMATCHED STATE OF CURRENT VALUE OF MONITORED DATA |
| AT CHANGE | WHEN CURRENT VALUE OF SPECIFIED DATA CHANGED |

PROGRAMMING SUPPORT PROGRAM FOR PREVENTING WORK EFFICIENCY FROM LOWERING AS A RESULT OF CONVERSION

CROSS-REFERENCE TO RELATED APPLICATION

The present application is based on PCT filing PCT/JP2020/013714, filed Mar. 26, 2020, the entire contents of which are incorporated herein by reference.

FIELD

The present disclosure relates to a programming support program storage medium, a programming support device, and a programming support method used for supporting creation of a program executed by a programmable logic controller.

BACKGROUND

Programs to be executed by programmable logic controllers have been typically described in readable programs such as a ladder language and a function block diagram (FBD) language. In contrast, demands for describing programs by using a procedural language such as a structured text (ST) language instead of a ladder language have recently been increasing.

In program development, use of programs developed in the past for effective work on creation of new programs have been widely practiced. In creation of a new program, however, a program described in a programming language different from the program to be created cannot be directly used even when the programs are to be used by the same hardware. Thus, technologies for converting a program described in a programming language into a program described in another programming language have been proposed (Patent Literature 1, for example).

CITATION LIST

Patent Literature

Patent Literature 1: Japanese Patent Application Laid-open No. 2001-022412

SUMMARY

Technical Problem

When a program described in a ladder language is converted into a program described in a procedural language, there is a problem in that the program readability decreases. The readability is lower as the structure of the blocks of the program before conversion is more complicated. When the readability is lowered, the efficiency of such work as development and editing of the program is also lowered.

The present disclosure has been made in view of the above, and an object thereof is to provide a programming support program capable of preventing the work efficiency from lowering when the program readability lowers as a result of conversion of a program described in a programming language other than a procedural language into a program described in a procedural language.

Solution to Problem

To solve the aforementioned problems and achieve the object, a programming support program according to the present disclosure includes a first conversion step of converting a first program described in a ladder language into a second program described in an intermediate language, and a second conversion step of converting the second program into a third program described in a procedural language. The programming support program also causes a computer to execute: a circuit display component generation step of, when a result of analysis of each block of the second program satisfies a predetermined condition, generating a circuit display component representing a content of a block satisfying the condition, and a display step of displaying the third program and the circuit display component in a format enabling recognition of correspondence between the circuit display component and a block of the third program.

Advantageous Effects of Invention

The programming support program according to the present disclosure produces an effect of enabling prevention of the work efficiency from lowering when the program readability lowers as a result of conversion of a program described in a programming language other than a procedural language into a program described in a procedural language.

BRIEF DESCRIPTION OF DRAWINGS

FIG. 18 is a table illustrating an example of triggering conditions for displaying a circuit display component.

DESCRIPTION OF EMBODIMENTS

A programming support program storage medium, a programming support device, and a programming support method according to embodiments of the present disclosure will be described in detail below with reference to the drawings.

Embodiment

Figure 1:
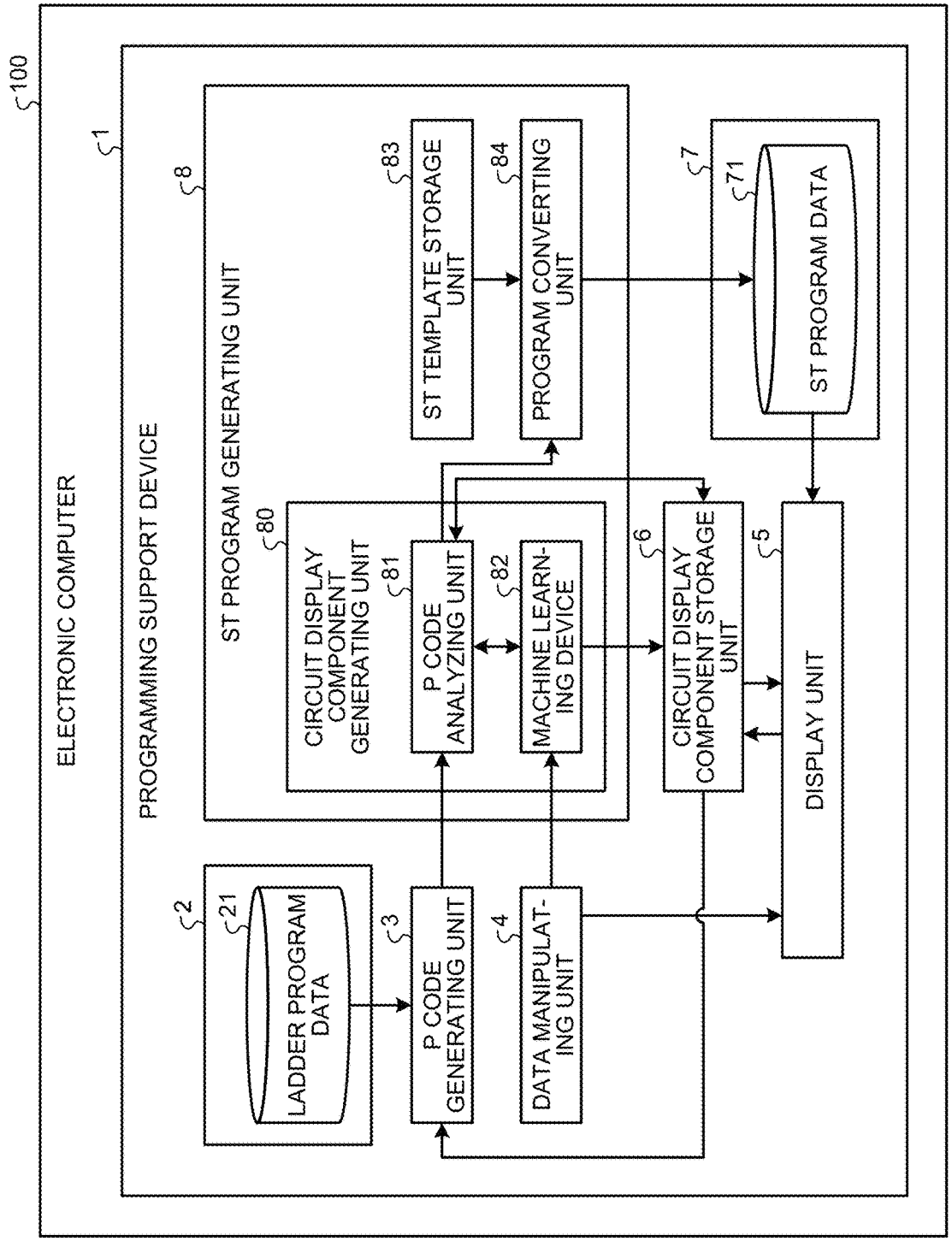
FIG. 1 is a diagram illustrating an example of a functional block configuration of a programming support device according to an embodiment.

In the present embodiment, a programming support device used for development of a program executed by a programmable logic controller will be described. The programming support device has a function of converting a ladder program, which is a program described in a ladder language, into an ST program, which is a program described in an ST language. FIG. 1 is a diagram illustrating an example of a functional block configuration of the programming support device according to the embodiment. The programming support device 1 illustrated in FIG. 1 is used for development of a program executed by a programmable logic controller.

The programming support device 1 includes a ladder program data storage unit 2, a P code generating unit 3, a data manipulating unit 4, a display unit 5, a circuit display component storage unit 6, an ST program data storage unit 7, and an ST program generating unit 8.

The ladder program data storage unit 2 stores ladder program data 21, which are data of a ladder program. The P code generating unit 3 converts a ladder program into a program described in P codes, which is an intermediate language. The P code generating unit 3 is a first conversion unit that converts a first program described in a ladder language into a second program described in an intermediate language. Note that computers cannot read programs described in a programming language. Thus, a program described in a programming language needs to be converted into a computer-readable machine language. Typically, in this process, a program described in a programming language is once converted into a program in intermediate representation and then reconverted into a program in a machine language instead of being directly converted into a program in a machine language. An intermediate language is used for converting a program described in a programming language into intermediate representation. Various kinds of intermediate language are present, and an intermediate language may also be called intermediate codes. P codes are one of various kinds of intermediate language used for creating a program in intermediate representation. The data manipulating unit 4 receives operation such as editing operation on data used by the programming support device 1 from a user. The display unit 5 displays various screens such as a screen for confirmation of a program and a screen for editing a program to the user. The circuit display component storage unit 6 stores circuit display components, which will be described later. The ST program data storage unit 7 stores ST program data 71, which are data of an ST program. The ST program generating unit 8 converts a program described in P codes into an ST program.

The ST program generating unit 8 includes a P code analyzing unit 81, a machine learning device 82, an ST template storage unit 83, and a program converting unit 84. The P code analyzing unit 81 and the machine learning device 82 constitute a circuit display component generating unit 80.

The P code analyzing unit 81 analyzes a P code program, which is a program described in P codes to generate data relating to the structure of the program, and generates circuit display components when the generated data satisfies a predetermined condition. The machine learning device 82 learns the conditions under which the P code analyzing unit 81 generates circuit display components on the basis of data generated by the P code analyzing unit 81 and data input from the data manipulating unit 4. The ST template storage unit 83 stores templates for converting a P code program into an ST program. The program converting unit 84 converts a P code program into an ST program. The program converting unit 84 is a second conversion unit that converts the second program into a third program described in a procedural language.

Note that the programming support device 1 is implemented by an electronic computer 100 as illustrated in FIG. 1. The electronic computer 100 is, for example, a personal computer including a central processing unit (CPU), a storage device, a display device, an input device, a communication device, and the like. The storage device is nonvolatile or volatile semiconductor memory such as a random access memory (RAM), a read only memory (ROM), or a flash memory, a magnetic disk, or the like. The display device is a liquid crystal display or the like that implements the display unit 5. The input device is a mouse, a keyboard, or the like. The communication device is a network interface card or the like. While an example of a configuration in which the electronic computer 100 includes a display device is illustrated in FIG. 1, the display device may be a separate device independent of the electronic computer 100.

The functions of the programming support device 1 are implemented by the CPU and the storage device of the electronic computer 100. Specifically, programming support programs, which are programs for implementing the functions of the programming support device 1 are stored in advance in the storage device, and the functions of the programming support device 1 are implemented by the CPU by reading and executing the programs stored in the storage device. In addition, the ladder program data storage unit 2, the circuit display component storage unit 6, and the ST program data storage unit 7 of the programming support device 1 are implemented by the storage device of the electronic computer 100. Note that the input device of the electronic computer 100 is used by the user to operate the programming support device 1. The communication device of the electronic computer 100 is used when the programming support device 1 communicates with a device external to the electronic computer 100. The programming support programs are written in a storage medium such as a compact disc (CD)-ROM or a digital versatile disc (DVD)-ROM, and supplied to a user in this state. The programming support programs may be supplied to a user via the Internet or the like.

Next, details of the operation of the programming support device 1 will be explained. Specifically, an operation of generating an ST program by converting a ladder program in a state in which learning has not been completed by the machine learning device 82 (referred to as a first ST program generating operation), an operation of generating an ST program by converting a ladder program in a state in which learning has been completed by the machine learning device 82 (referred to as a second ST program generating operation), an operation of displaying circuit display components with an ST program obtained by the conversion (referred to as a program displaying operation), and an operation of editing generated circuit display components (referred to as a circuit display component editing operation) will be explained.

[First ST Program Generating Operation]

The first ST program generating operation in which the programming support device 1 generates an ST program by converting a ladder program in a state in which learning has not been completed by the machine learning device 82 will be explained. In the first ST program generating operation, the programming support device 1 converts a ladder program into an ST program, and learns the conditions for generation of circuit display components.

Figure 2:
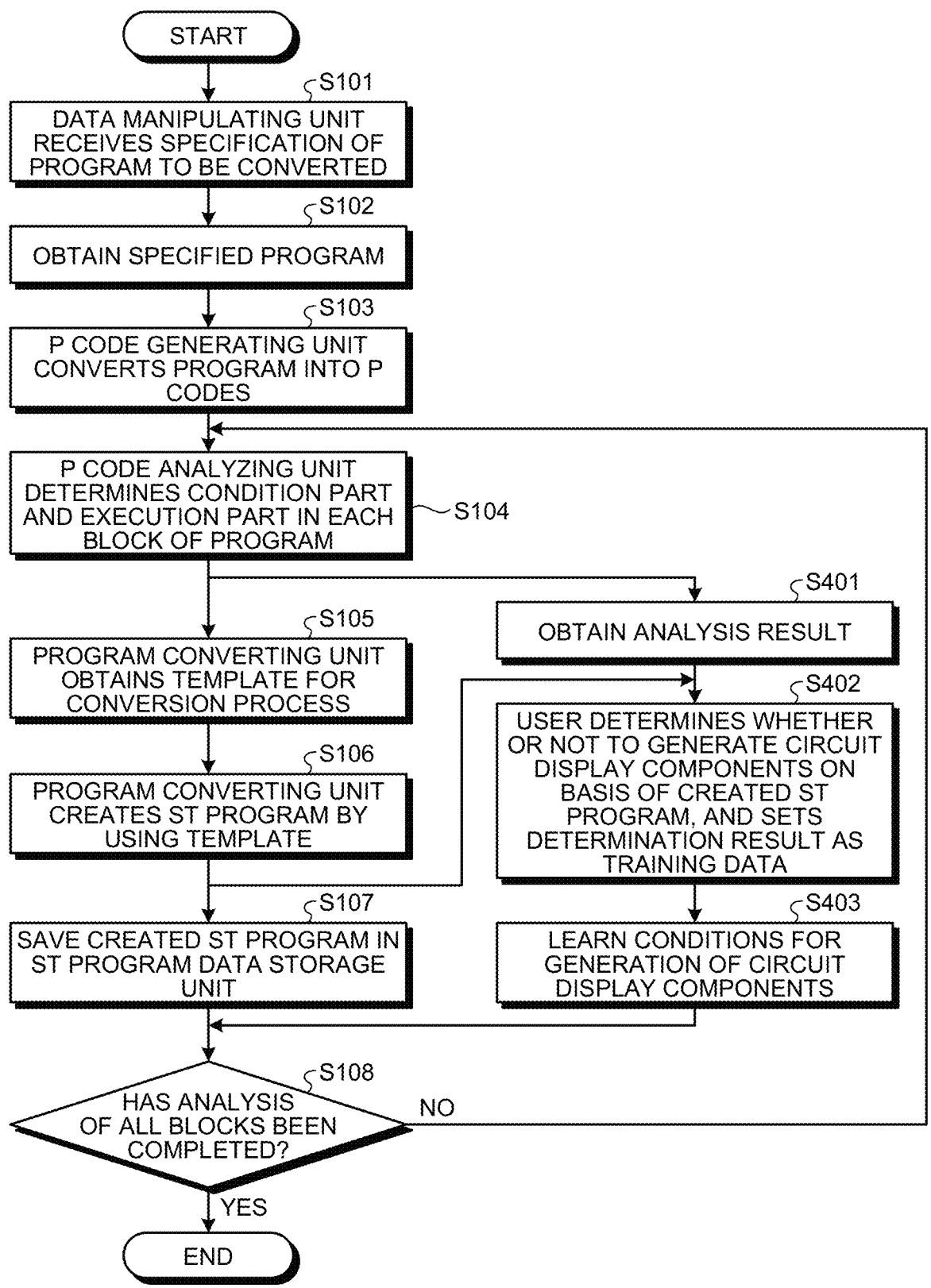
FIG. 2 is a flowchart illustrating a first ST program generating operation performed by the programming support device.

FIG. 2 is a flowchart illustrating the first ST program generating operation performed by the programming support device 1. When learning by the machine learning device 82, that is, learning of the conditions for generation of circuit display components has not been completed at a point when an operation of an instruction to start generation of an ST program is received, the programming support device 1 starts the first ST program generating operation.

Figure 3:
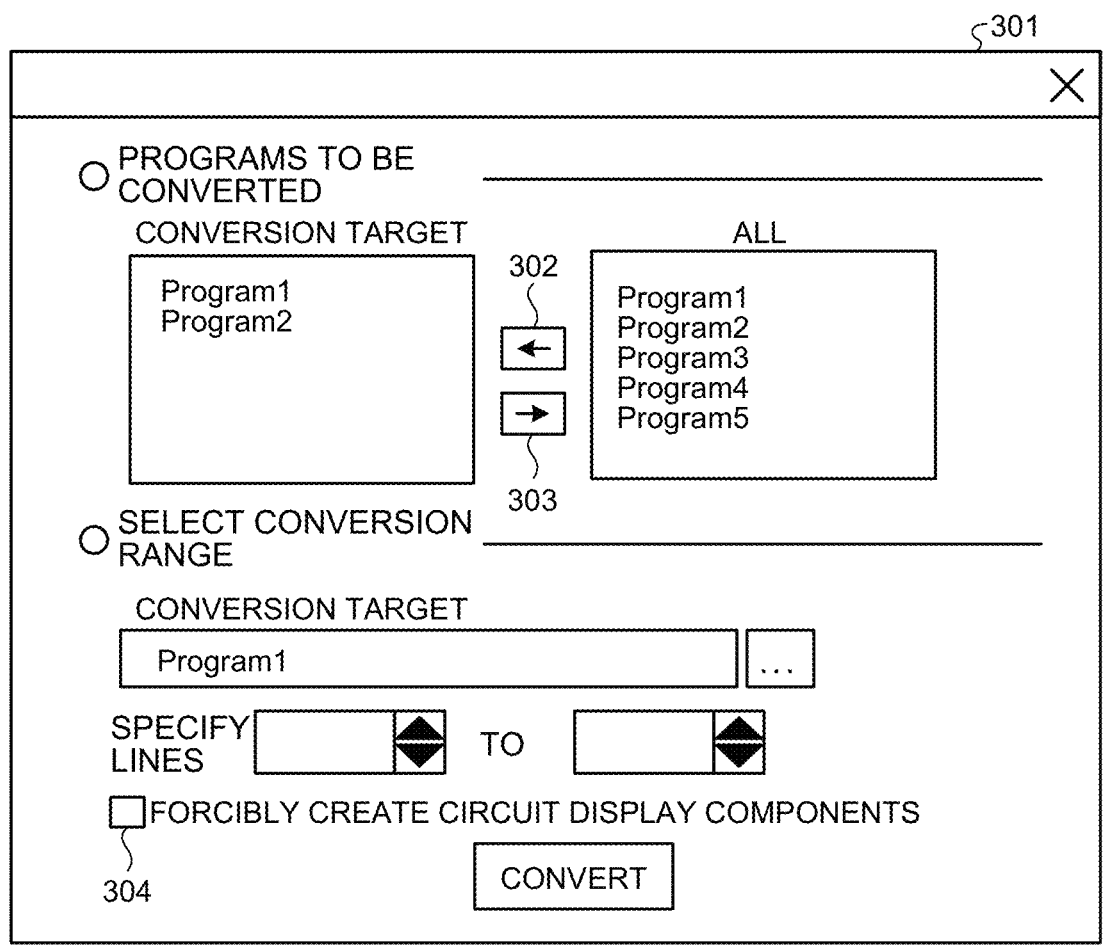
FIG. 3 is a diagram illustrating an example of a program-to-be-converted specification screen.

In the first ST program generating operation, the data manipulating unit 4 first receives specification of a program to be converted (step S101). In step S101, the data manipulating unit 4, in cooperation with the display unit 5, displays a program-to-be-converted specification screen 301 illustrated in FIG. 3, for example, on the display unit 5 to receive a user's operation. FIG. 3 is a diagram illustrating an example of the program-to-be-converted specification screen 301. The data manipulating unit 4 receives, from the user, specification of a ladder program to be converted into an ST program among ladder programs included in the ladder program data 21. In addition, the data manipulating unit 4 receives selection of a range to be actually converted (conversion range selection) in each of ladder programs to be converted. Note that reception of conversion range selection is not essential, and the user may omit input of conversion range selection. When input of conversion range selection is omitted, the programming support device 1 deems that the conversion range corresponds to the whole of the program to be converted. Note that the user can add a program to programs to be converted by selecting the program in a field described as "all" and clicking a left arrow button 302. In addition, the user can remove a program from programs to be converted by selecting the program (program to be converted) in a field described as "conversion target" and clicking a right arrow button 303. The program-to-be-converted specification screen 301 also includes a checkbox 304 for receiving specification to forcibly create circuit display components. When the checkbox 304 is checked, the programming support device 1 creates circuit display components regardless of whether or not the conditions for creation of circuit display components have been satisfied for all the blocks constituting the program to be converted. Note that, hereinafter, the checkbox 304 is assumed to be unchecked in the description.

When a convert button is clicked, step S101 is terminated, and the operation proceeds to step S102.

When step S101 is terminated, the P code generating unit 3 obtains the ladder program specified in step S101 from the ladder program data 21 (step S102), and converts each of the blocks constituting the obtained ladder program into a P code to generate a P code program (step S103).

Figure 4:
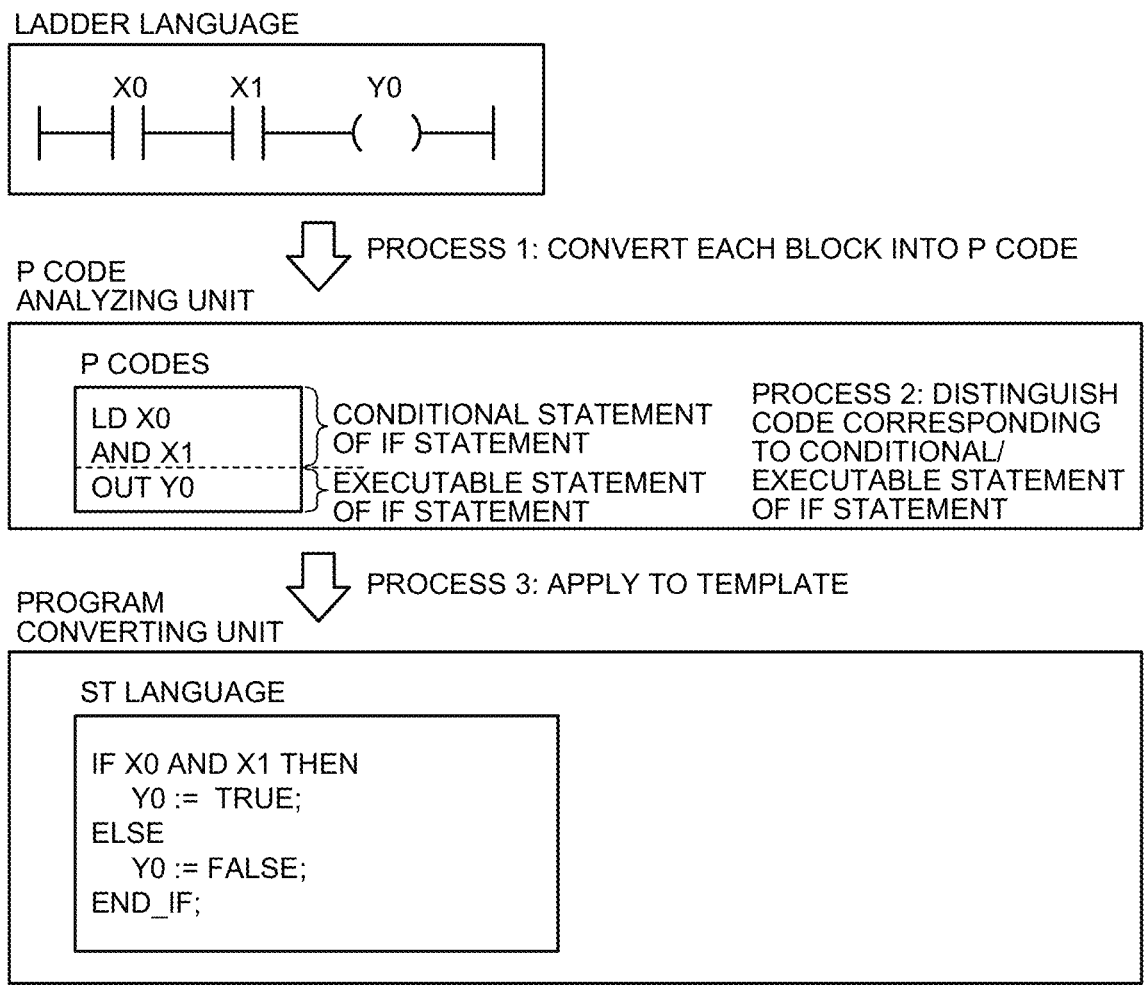
FIG. 4 is a diagram illustrating an outline of an operation of converting a ladder program into an ST program by the programming support device.

Subsequently, the P code analyzing unit 81 determines a condition part and an execution part of each block of the P code program (step S104). Note that a ladder program can be typically divided into condition parts constituted by instructions such as contact instructions and comparison operation instructions, and execution pats constituted by string processing, real number processing, output instructions, and the like. In conversion into an ST program, these can be replaced with conditional expressions and executable statements in IF statements. Thus, in step S104, as illustrated in process 2 in FIG. 4, the P code analyzing unit 81 analyzes a program (P code program) described in P codes, and determines codes corresponding to conditional statements of IF statements and codes corresponding to executable statements thereof as condition parts and execution parts, respectively. FIG. 4 is a diagram illustrating an outline of the operation of converting a ladder program into an ST program by the programming support device 1. FIG. 4 illustrates an outline of the operation of converting one block of the ladder program into an ST program. Process 1 illustrated in FIG. 4 corresponds to step S103 described above.

After the process in step S104 is terminated, an ST program generating process in steps S105 to S107 and a learning process in steps S401 to S403 are performed in parallel on one block on which the determination process has been performed in step S104. Hereinafter, the ST program generating process in steps S105 to S107 and the learning process in steps S401 to S403 will be explained separately.

(ST Program Generating Process)

In the ST program generating process, subsequently to step S104 described above, the program converting unit 84 obtains a template for a conversion process from the ST template storage unit 83 (step S105), and creates an ST program by using the template (step S106). Specifically, as illustrated in process 3 in FIG. 4, the program converting unit 84 applies the result of analysis of the P code program performed by the P code analyzing unit 81 to the template to create an ST program. The program converting unit 84 stores the generated ST program into the ST program data storage unit 7 (step S107).

(Learning Process)

Figure 5:
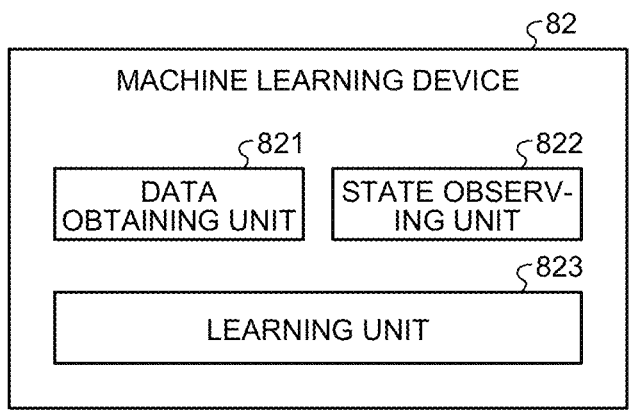
FIG. 5 is a diagram illustrating a functional block configuration of a machine learning device included in the programming support device.

The learning process in steps S401 to S403 is performed by the machine learning device 82. The machine learning device 82 has a functional block configuration as illustrated in FIG. 5. FIG. 5 is a diagram illustrating a functional block configuration of the machine learning device 82 included in the programming support device 1. Specifically, the machine learning device 82 includes a data obtaining unit 821 that obtains training data to be used for machine learning, a state observing unit 822 that observes state variables input from the P code analyzing unit 81, and a learning unit 823 that learns the conditions for generation of circuit display components on the basis of the training data obtained by the data obtaining unit 821 and the result of observation of the state variables by the state observing unit 822.

Figures 6, 7:
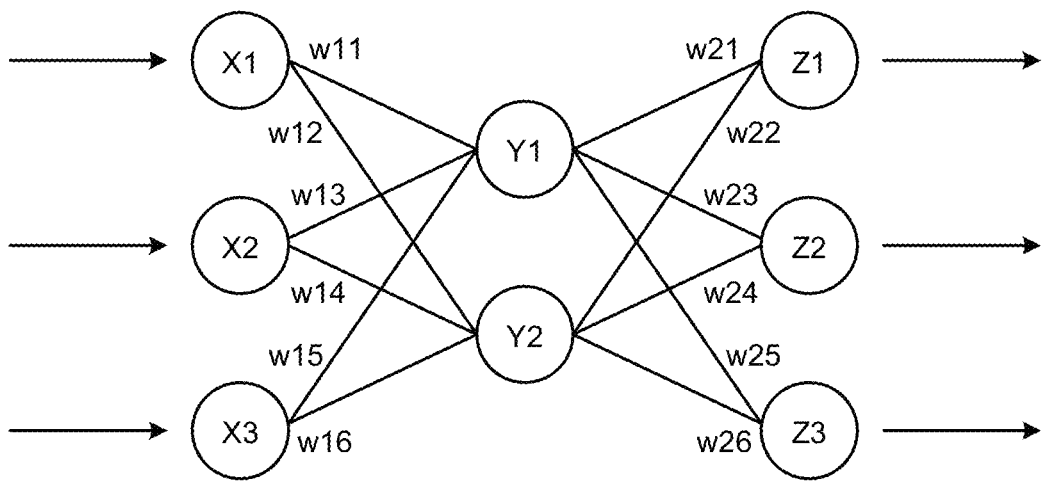
FIG. 6 is a table illustrating an example of a structure of data for learning used in machine learning by the machine learning device.
FIG. 7 is a diagram illustrating an example of a configuration of a neural network.

FIG. 6 is a table illustrating an example of a structure of data for learning used in machine learning by the machine learning device 82. The data for learning are constituted by training data obtained by the data obtaining unit 821 and state variables observed by the state observing unit 822. Input 1 to input 3 illustrated in FIG. 6 are data input from the P code analyzing unit 81 to the machine learning device 82, and correspond to state variables observed by the state observing unit 822. The data of the input 1 to the input 3 include information relating to the structure of a ladder program to be converted. The "number of conditions for executing one instruction" of the input 1 indicates the number of conditions that have influence on execution of one instruction. This is simply because the number of terms of conditional statements of IF statements increases and a conditional expression becomes more complicated as the number of conditions constituting a circuit increases. The "number of instructions sharing one condition" of the input 2 indicates the number of instructions sharing one condition for each condition. Among these conditions, those which can be combined by AND or OR are set in combination. The "number of instructions sharing one condition" of the input 2 affects the number of branches of IF statements. The "numbers of ANBs, ORBs, MPSs, MRDs and MPPs constituting a circuit" of the input 3 indicate the number of ANBs, which are instructions to connect circuit blocks in series, the number of ORBs, which are instructions to connect circuit blocks in parallel, the number of MPSs, which are computation result push instructions, the number of MRDs, which are instructions to read a computation result, and the number of MPPs, which are computation result pop instructions. The data of the input 3 indicate the complexity of circuit configuration. In the present embodiment, training data are data of a result of determination, which is made by the user who has checked an ST program obtained by converting a ladder program, on whether or not generation of circuit display components corresponding to the checked ST program is necessary.

In the learning process performed by the machine learning device 82, subsequently to step S104 described above, the state observing unit 822 obtains the result of analysis of the program from the P code analyzing unit 81 (step S401). Specifically, in step S401, the state observing unit 822 observes, as state variables, the data of the input 1 to the input 3 illustrated in FIG. 6 input from the P code analyzing unit 81.

Subsequently, the user determines whether or not to generate circuit display components on the basis of the ST program created in step S106 described above, and the determination result is set as training data (step S402). In step S402, the display unit 5 reads the ST program generated by the program converting unit 84 in step S106 from the ST program data storage unit 7, and displays the ST program. In addition, the data manipulating unit 4 receives input of the result of determination on whether or not generation of circuit display components corresponding to the ST program displayed by the display unit 5 is necessary from the user, and outputs the result as training data described in FIG. 6 to the machine learning device 82. In the machine learning device 82, the data obtaining unit 821 obtains the training data from the data manipulating unit 4. When steps S401 and S402 are terminated, the data for learning having the structure described in FIG. 6 are obtained.

Subsequently, the learning unit 823 learns the conditions for generation of the circuit display components on the basis of the data for learning (step S403).

Details of step S403 will now be explained. In step S403, the learning unit 823 learns the conditions for generation of circuit display components on the basis of a data set created on the basis of combination of the state variables observed by the state observing unit 822 and the training data obtained by the data obtaining unit 821. Note that the data set is data including the state variables and the training data associated with each other.

While the machine learning device 82 is used for learning the conditions for generation of circuit display components in the programming support device 1, the machine learning device 82 may be a device separate from the programming support device 1 and connected with the programming support device 1 via a network, for example. In this case, the machine learning device 82 may be present in a cloud server.

The learning unit 823 learns the conditions for generation of circuit display components through so-called supervised learning in accordance with a neural network model, for example. Note that supervised learning refers to a model in which a large number of data sets, which are data sets of inputs and results (labels), are given to the learning unit 823 to learn features of the data sets, and a result is estimated from an input.

The neural network is constituted by an input layer constituted by a plurality of neurons, an intermediate layer (hidden layer) constituted by a plurality of neurons, and an output layer constituted by a plurality of neurons. The number of intermediate layers may be one, or two or more.

FIG. 7 is a diagram illustrating an example of a configuration of a neural network. In a case of a neural network with three layers as illustrated in FIG. 7, for example, when a plurality of inputs are input to the input layer (X1-X3), the values thereof are multiplied by weights W1 (w11-w16) and input to the intermediate layer (Y1-Y2), and the resulting values are further multiplied by weights W2 (w21-w26) and output from the output layer (Z1-Z3). The output results vary depending on the values of the weights W1 and W2.

In the present embodiment, the neural network learns the conditions for generation of circuit display components that are easily viewable by the user when a ladder program is converted into an ST program in accordance with the data sets through so-called supervised learning. Specifically, the neural network learns the conditions for generation of circuit display components by adjusting the weights W1 and W2 such that the result output from the output layer when a state variable is input to the input layer becomes closer to the value of the training data.

In addition, the neural network can also learn the conditions for generation of circuit display components through so-called unsupervised learning. Unsupervised learning is a method of learning a device that gives only a large amount of input data to a machine learning device to learn how the input data are distributed, and performs compression, classification, shaping, and the like on the input data without associated training output data being given. The neural network can cause similar features of input data to be clustered. The result thereof can be used to predict an output by setting a certain criterion, and assigning an output that optimizes the criterion. There is also learning called semi-supervised learning as intermediate problem setting between unsupervised learning and supervised learning. In semi-supervised learning, some data sets of input data and training data are present, and data for learning of input data only are used for the other data sets.

The learning unit 823 may learn the conditions for generation of circuit display components in accordance with data sets created for a plurality of programming support devices 1. Note that the learning unit 823 may obtain data sets from a plurality of programming support devices 1 used at the same site, or may obtain data sets from the programming support devices 1 used independently at sites different from each other. Furthermore, a programming support device 1 from which data sets are to be collected can be added or removed during learning. In addition, a machine learning device 82 that has learned the conditions for generation of circuit display components for a programming support device 1 may be attached to another programming support device 1 to relearn and update the conditions for generation of circuit display components for the other programming support device 1.

In addition, a learning algorithm used by the learning unit 823 can be deep learning for learning extraction of feature quantities themselves. In addition, the learning unit 823 may perform learning in accordance with other known methods such as genetic programming, functional logic programming, and a support vector machine, for example.

Figure 8:
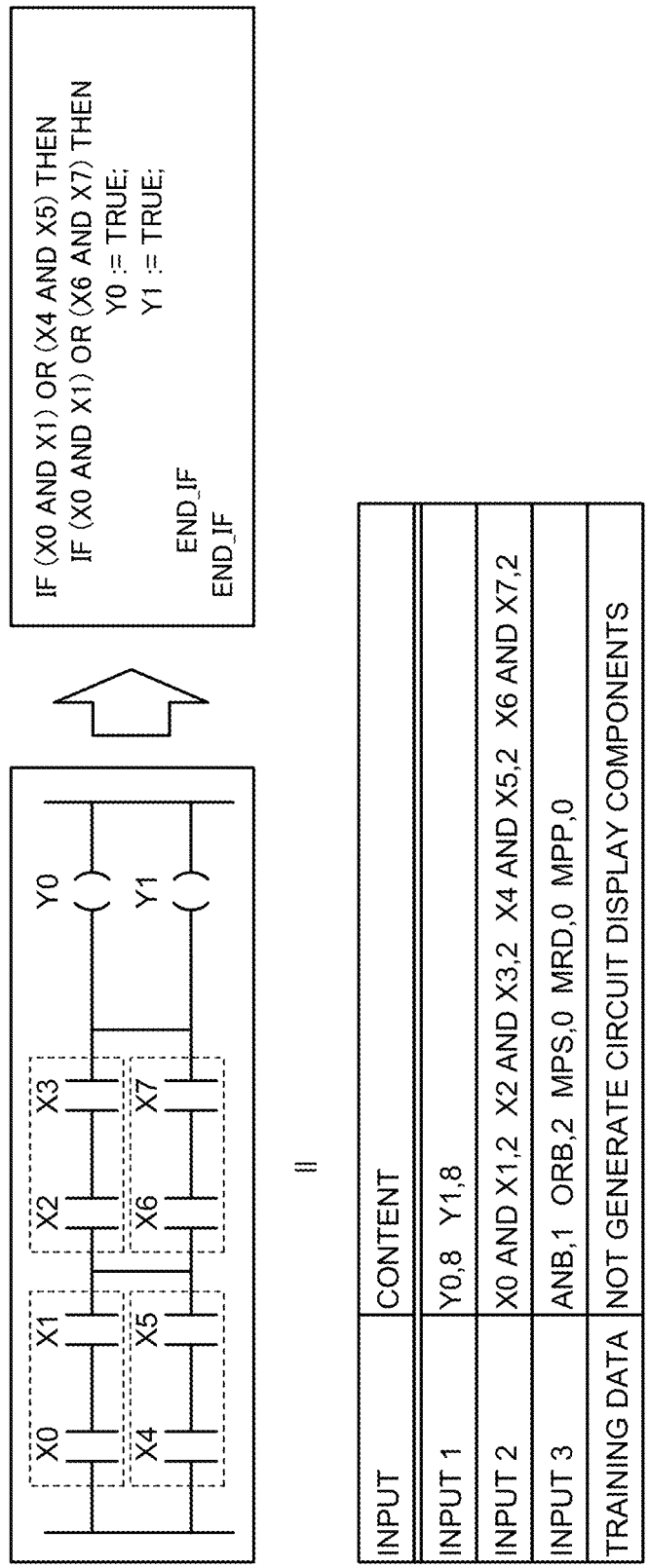
FIG. 8 is a diagram illustrating a first example of data for learning used for learning by the machine learning device.

Specific examples of the data for learning used in the present embodiment will be described. FIG. 8 is a diagram illustrating a first example of the data for learning used for learning by the machine learning device 82. FIG. 8 describes a combination of a ladder program on which the data for learning are based and an ST program obtained by conversion. The data for learning in the first example illustrated in FIG. 8 is an example of a case where the training data are "not to generate circuit display components", that is, a case where the user has selected not to generate circuit display components.

Data of the input 1 include "Y0,8" and "Y1,8". "Y0,8" indicates that the condition parts that affect the value of an output Y0 are eight conditions X0 to X7. The same is applicable to "Y1,8".

Data of the input 2 include "X0 AND X1,2", "X2 AND X3,2", "X4 AND X5,2", and "X6 AND X7,2". "X0 AND X1,2" indicates that X0 and X1 are combined by AND operation into one condition, and this condition is used by two instructions Y0 and Y1. The same is applicable to "X2 AND X3,2", "X4 AND X5,2", and "X6 AND X7,2".

Data of the input 3 include "ANB,1", "ORB,2", "MPS,0", "MRD,0", and "MPP,0". "ANB,1" indicates that one ANB, which is an instruction to connect circuit blocks in series, is present. "ORB,2" indicates that two ORBs, which are instructions to connect circuit blocks in parallel, are present. "MPS,0" indicates that no MPS, which is a computation result push instruction, is present. "MRD,0" indicates that no MRD, which is an instruction to read a computation result, is present. "MPP,0" indicates that no MPP, which is a computation result pop instruction, is present.

In the first example, because the maximum depth of IF statements is two and the maximum number of logical operation terms of conditional expressions of IF statements is two, and the original ladder program can be easily guessed from the ST program obtained by conversion, the user determines that generation of circuit display components is not necessary.

Figure 9:
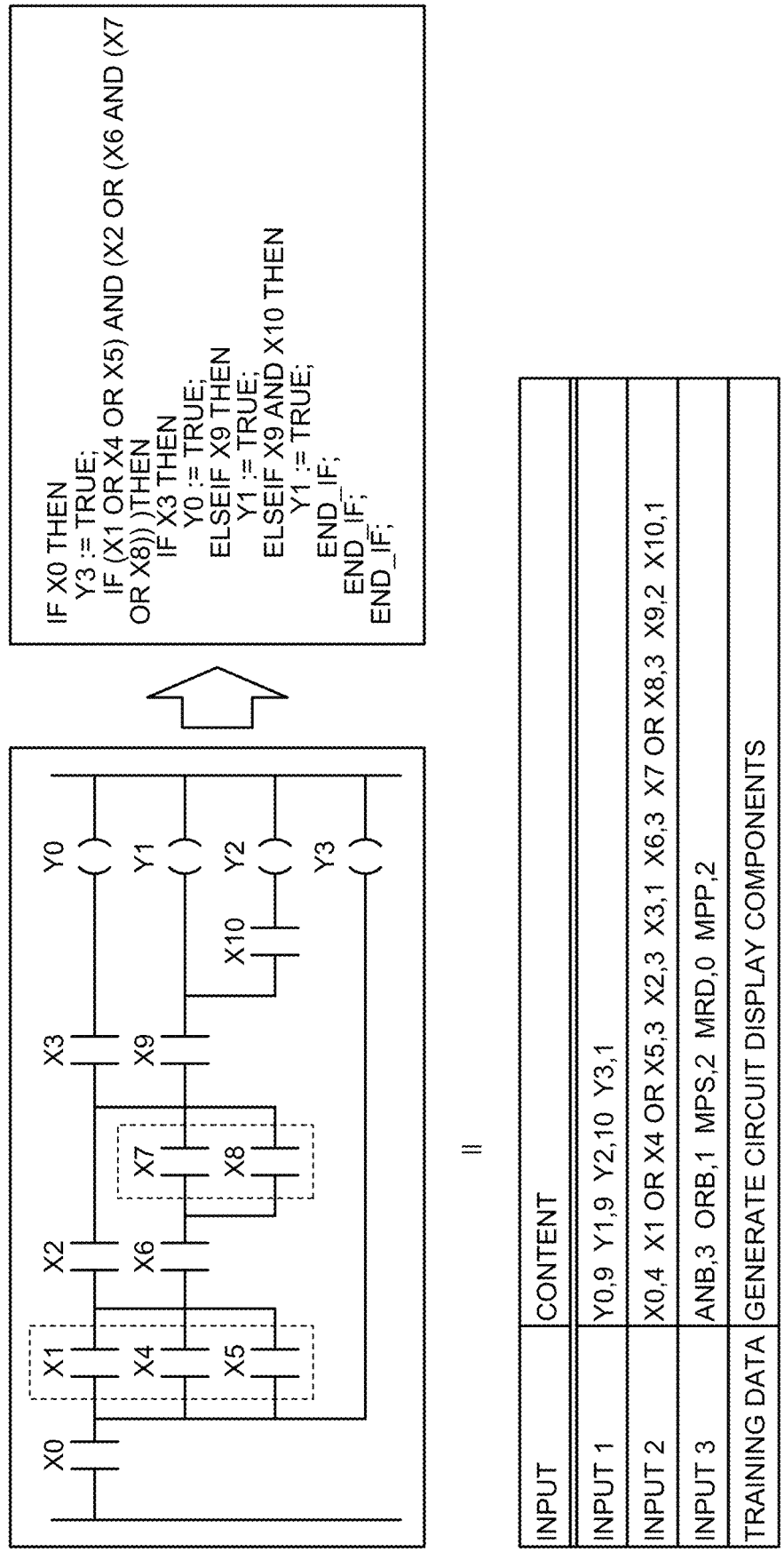
FIG. 9 is a diagram illustrating a second example of data for learning used for learning by the machine learning device.

FIG. 9 is a diagram illustrating a second example of the data for learning used for learning by the machine learning device 82. In a manner similar to FIG. 8, FIG. 9 describes a combination of a ladder program on which the data for learning are based and an ST program obtained by conversion. The data for learning in the second example illustrated in FIG. 9 is an example of a case where the training data are "to generate circuit display components", that is, a case where the user has selected to generate circuit display components.

Data of the input 1 include "Y0,9", "Y1,9", "Y2,10", and "Y3,1". Data of the input 2 include "X0,4", "X1 OR X4 OR X5,3", "X2,3", "X3,1", "X6,3", "X7 OR X8,3", "X9,2", and "X10,1". Data of the input 3 include "ANB,3", "ORB,1", "MPS,2", "MRD,0", and "MPP,2".

In the second example, the data of the input 1 indicate that a large number of conditions for executing one instruction are present, the data of the input 2 indicate that conditions X1 to X10 relate to output values of Y0 to Y2, and the data of the input 3 indicate that series circuit blocks and parallel circuit blocks are present and that calculation using a stack needs to be performed for the circuit. Because it is difficult to guess the structure of the original ladder program from the ST program obtained by conversion, the user determines that generation of circuit display components is necessary.

The description refers back to FIG. 2, in which, after the ST program generating process in steps S105 to S107 and the learning process in steps S401 to S403 are terminated, the ST program generating unit 8 checks whether analysis of all the blocks of the program to be converted, that is, the process of conversion to an ST program and the process of learning the conditions for generation of circuit display components for all the blocks have been completed (step S108). If analysis of all the blocks has been completed (step S108: Yes), the operation illustrated in FIG. 2 is terminated. In contrast, if analysis of all the blocks has not been completed (step S108: No), the operation returns to step S104.

The first ST program generating operation described above is performed until the conditions for generation of circuit display components have been sufficiently learned through repetition of the learning operation in steps S401 to S403 described above. Whether or not the conditions for generation of circuit display components have been sufficiently learned is determined on the basis of whether or not the number of times steps S401 to S403 are repeated has reached a predetermined value, for example.

[Second ST Program Generating Operation]

Next, the second ST program generating operation in which the programming support device 1 generates an ST program by converting a ladder program in a state in which learning has been completed by the machine learning device 82 will be explained. In the second ST program generating operation, the programming support device 1 converts a ladder program into an ST program, and determines whether or not generation of circuit display components is necessary by using the result of learning by the machine learning device 82. In other words, the result of learning by the machine learning device 82 is used for a process of determining whether or not the conditions for generation of circuit display components are satisfied. Upon determining that generation of circuit display components is necessary, the programming support device 1 generates the circuit display components.

Figure 10:
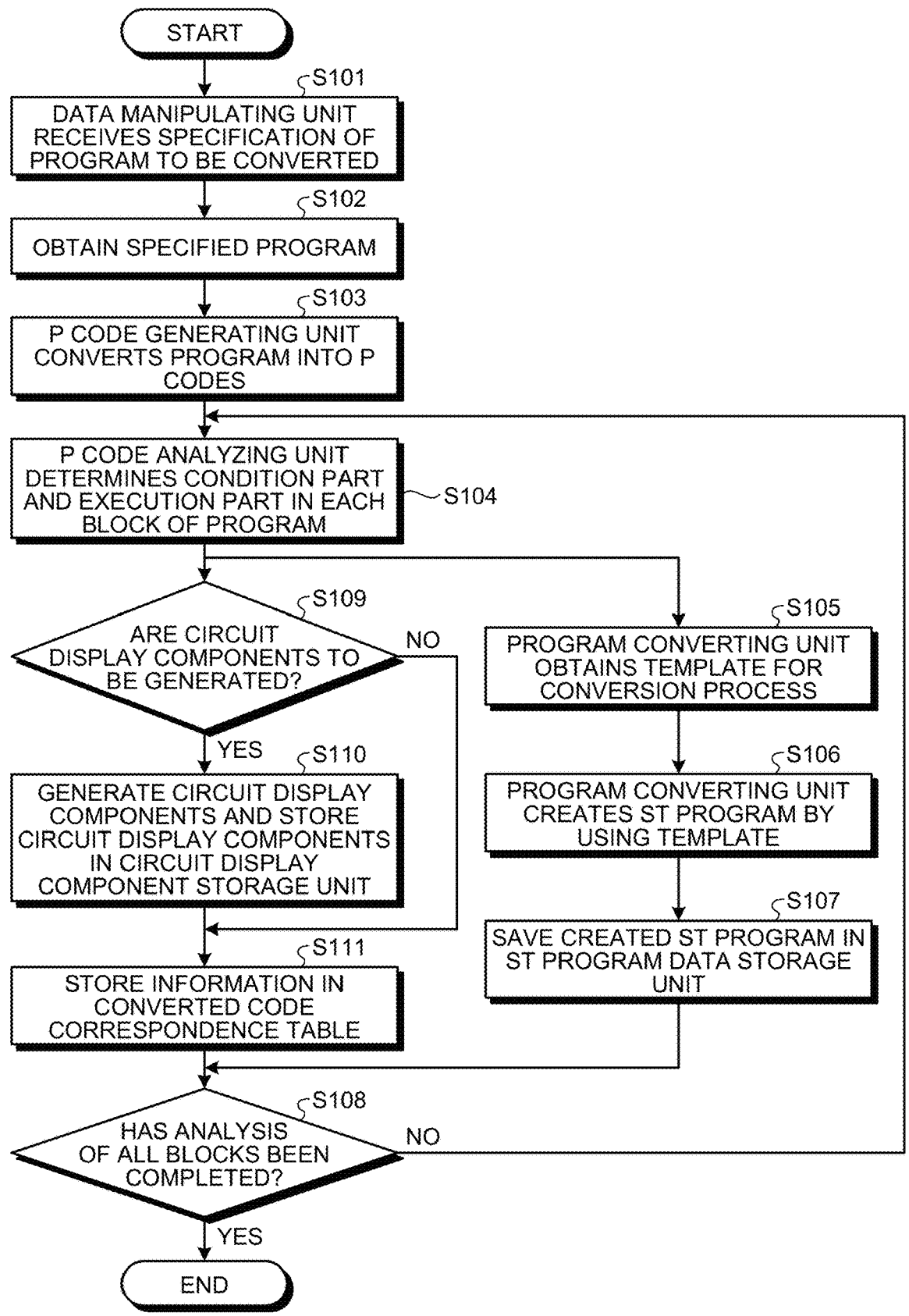
FIG. 10 is a flowchart illustrating a second ST program generating operation performed by the programming support device.

FIG. 10 is a flowchart illustrating the second ST program generating operation performed by the programming support device 1. When learning by the machine learning device 82, that is, learning of the conditions for generation of circuit display components has been completed at a point when an operation of an instruction to start generation of an ST program is received, the programming support device 1 starts the second ST program generating operation.

The flowchart illustrated in FIG. 10 corresponds to the flowchart illustrated in FIG. 2 except that steps S401 to S403 are removed and steps S109 to S111 are added. Because steps S101 to S108 in the flowchart illustrated in FIG. 10 are the same as steps S101 to S108 in the flowchart illustrated in FIG. 2, the explanation thereof will not be repeated.

In the second ST program generating operation, subsequently to step S104, steps S109 to S111 are performed in parallel with the ST program generating process in steps S105 to S107 described above. Specifically, the P code analyzing unit 81 determines whether or not to generate circuit display components (step S109). In step S109, the P code analyzing unit 81 determines whether or not to generate circuit display components on the basis of the result of learning by the machine learning device 82 and the result of analysis of the ladder program to be converted. Herein, the result of analysis of the ladder program to be converted refers to an analysis result similar to that used by the machine learning device 82 for learning the conditions for generation of circuit display components, and is, specifically, data similar to the input 1 to the input 3 of data for learning illustrated in FIG. 6, etc.

If it is determined to generate circuit display components (step S109: Yes), the P code analyzing unit 81 generates the circuit display components, stores the circuit display components in the circuit display component storage unit 6 (step S110), and stores information in a converted code correspondence table (step S111). In step S110, the P code analyzing unit 81 extracts one block from the ladder program, and stores the block as a circuit display component in the circuit display component storage unit 6. The block to be extracted from the ladder program is a block corresponding to a block in the P code program on which determination is performed in step S104, and corresponds to one block in the ladder program converted into a P code in the process 1 illustrated in FIG. 4. The converted code correspondence table in which information is stored in step S111 is a table in which various kinds of information indicating the correspondence between a ladder program before conversion and an ST program obtained by conversion are registered. More specifically, the converted code correspondence table is a table in which information indicating which part (block) of the ladder program before conversion corresponds to which part (block) of the ST program obtained by conversion, information indicating whether or not a corresponding circuit display component is present for each of the blocks constituting the ST program, information indicating which block of the ST program each of the generated circuit display components corresponds to, and the like are registered. The converted code correspondence table is held by the circuit display component storage unit 6, for example. Alternatively, the circuit display component generating unit 80 or the display unit 5 may hold the converted code correspondence table.

Figures 11, 12:
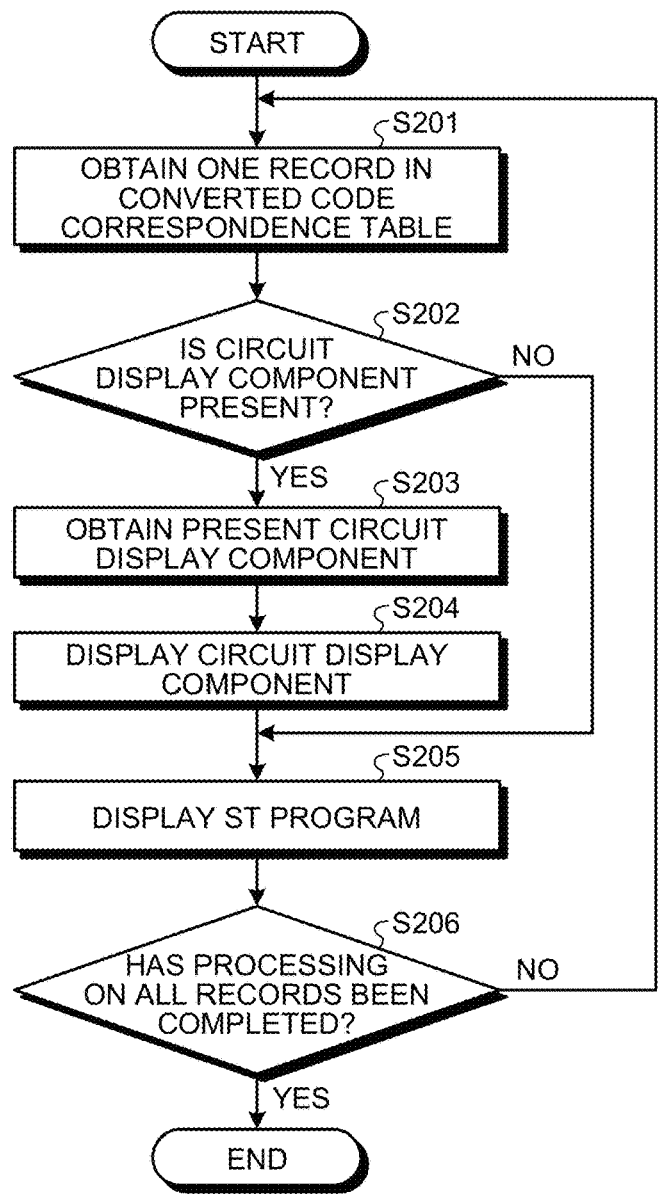
FIG. 11 is a diagram illustrating an example of a converted code correspondence table.
FIG. 12 is a flowchart illustrating a program displaying operation performed by the programming support device.

FIG. 11 is a diagram illustrating an example of the converted code correspondence table. In each of records constituting the converted code correspondence table, information on any one of the blocks constituting the ladder program to be converting is stored. In other words, the converted code correspondence table contains records corresponding to individual blocks constituting the ladder program to be converted. In one record of the converted code correspondence table, a ladder program name, an ST program name, LD position information, presence or absence of a component, a component number, and ST position information are registered. The "ladder program name" is the name of the ladder program before conversion, and the "ST program name" is the name of the ST program obtained by conversion. The "LD position information" is information indicating a position in the ladder program before conversion, which is one of the blocks constituting the ladder program. In other words, the "LD position information" indicates the position of a block in the ladder program. The "presence or absence of component" is information indicating whether or not a circuit display component corresponding to the block indicated by the LD position information is present. "Presence or absence of component=TRUE" indicates that a circuit display component is present, and "presence or absence of component=FALSE" indicates that no circuit display component is present. The "component number" is a control number assigned to each circuit display component, and a numerical value is entered in the case of "presence or absence of component=TRUE", or "-" is entered in the case of "presence or absence of component=FALSE". The "ST position information" is information indicating the position (block) in the ST program corresponding to the position (block) in the ladder program indicated by the LD position information in the same record.

If it is determined not to generate circuit display components (step S109: No), the P code analyzing unit 81 performs step S111 without performing step S110. Note that the converted code correspondence table is used for displaying an ST program generated by converting a ladder program on the display unit 5.

After performing step S111, the ST program generating unit 8 checks whether analysis of all the blocks of the program to be converted has been completed (step S108).

In the present embodiment, when machine learning has been completed, the programming support device 1 determines whether or not generation of circuit display components is necessary, and circuit display components are generated when it is determined to be necessary. Specifically, in the first ST program generating operation, the user determines whether or not generation of circuit display components is necessary, but circuit display components are not actually generated. Circuit display components, however, may also be generated in the first ST program generating operation. In a case where circuit display components are also generated in the first ST program generating operation, processes similar to those in steps S110 and S111 described above may be performed when the user has determined that generation of circuit display components is necessary in step S402 of the flowchart of FIG. 2 illustrating the first ST program generating operation, for example. Alternatively, it may be determined whether or not generation of circuit display components is necessary by using a predetermined condition in a state where machine learning has not been completed, and circuit display components may be generated when it is determined to be necessary. In this case, processes similar to those in steps S109 to S111 illustrated in FIG. 10 are performed in parallel with the processes in steps S105 to S107 and the processes in steps S401 to S403 in the flowchart illustrated in FIG. 2, for example. In this case, the condition used for determining whether or not to generate circuit display components is "when IF statements with the number of nested IF statements being three or more and the number of terms of conditional statements being five or more are included in the ST program", for example. The number of nested IF statements and the number of terms of conditional statements are an example, and are not limited to these numbers.

[Program Displaying Operation]

Next, the program displaying operation in which the display unit 5 displays the ST program data 71 stored in the ST program data storage unit 7 will be explained.

FIG. 12 is a flowchart illustrating the program displaying operation performed by the programming support device 1. Upon receiving an operation of an instruction to start display of the ST program data 71 stored in the ST program data storage unit 7 on the display unit 5 from the user, the programming support device 1 starts the program displaying operation.

In the program displaying operation, the display unit 5 first obtains one record of the converted code correspondence table (see FIG. 11) (step S201), and checks whether a circuit display component is present (step S202). Specifically, in step S201, the display unit 5 checks whether the "presence or absence of component" in the record obtained in step S201 indicates that a circuit display component is present (TRUE).

If a circuit display component is present (step S202: Yes), the display unit 5 obtains, from the circuit display component storage unit 6, the circuit display component, that is, the circuit display component associated with the "component number" in the record obtained in step S201 (step S203). Subsequently, the display unit 5 displays the circuit display component obtained in step S203 (step S204), and displays the ST program (step S205). In step S205, the display unit 5 displays a block in the ST program indicated by the "ST position information" in the record obtained in step S201. The display unit 5 displays the circuit display component and the ST program in such a format that the user can recognize which part (block) of the ST program the circuit display component represents. Details of the format in which the display unit 5 displays the circuit display component and the ST program will be explained separately.

If no circuit display component is present (step S202: No), the display unit 5 displays the ST program without performing steps S203 and S204 (step S205).

After performing step S205, the display unit 5 checks whether processing on all the records in the converted code correspondence table has been completed, that is, whether steps S201 to S205 have been performed on all the records (step S206). If processing on all the records have been completed (step S206: Yes), the operation illustrated in FIG. 12 is terminated. In contrast, if processing on all the records has not been completed (step S206: No), the operation returns to step S201.

[Circuit Display Component Editing Operation]

Next, operation of editing generated circuit display components will be explained.

Figure 13:
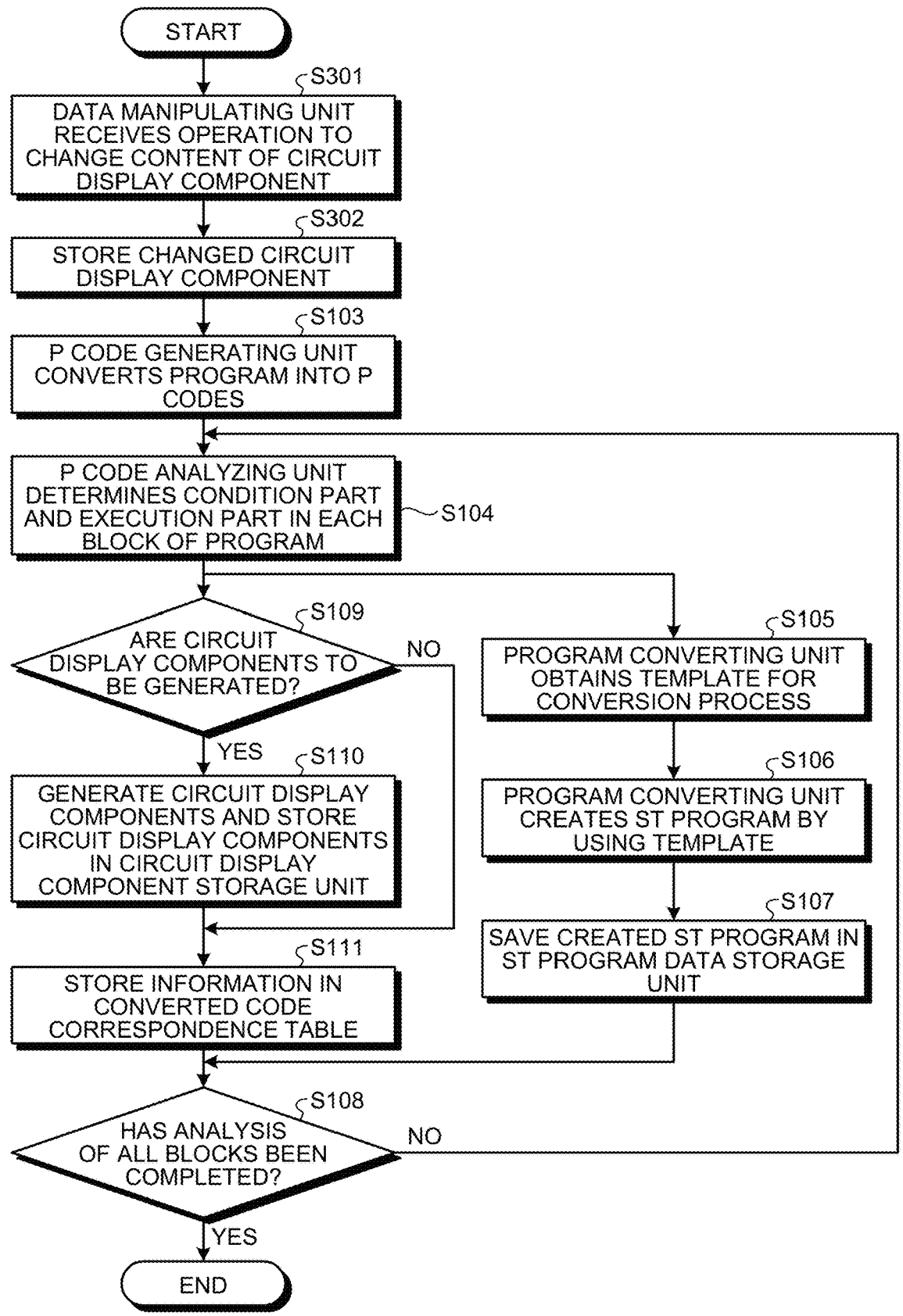
FIG. 13 is a flowchart illustrating a circuit display component editing operation performed by the programming support device.

FIG. 13 is a flowchart illustrating a circuit display component editing operation performed by the programming support device 1. Upon receiving an operation of an instruction to start editing the circuit display components stored in the circuit display component storage unit 6 from the user, the programming support device 1 starts the circuit display component editing operation.

In the circuit display component editing operation, the data manipulating unit 4 first receives an operation to change the content of a circuit display component (step S301). The operation to change the content of a circuit display component may be any operation that can edit a generated circuit display component. An example of the operation of receiving an operation to change the content of a circuit display component will be briefly explained. For example, upon receiving an operation of an instruction to start editing the circuit display components stored in the circuit display component storage unit 6 by the data manipulating unit 4, the programming support device 1 displays a list of circuit display components stored in the circuit display component storage unit 6 on the display unit 5, and receives, by the data manipulating unit 4, specification of a circuit display component to be edited. Subsequently, the programming support device 1 displays an editing screen for the specified circuit display component on the display unit 5, and the data manipulating unit 4 receives an operation to change the circuit display component. In the present embodiment, because the circuit display component is one block of the ladder program, the operation to change the circuit display component is an operation similar to a typical operation to change a ladder program.

When the operation of changing the content of the circuit display component by the user is completed, the changed circuit display component is stored in the circuit display component storage unit 6 (step S302). When step S302 is completed, the programming support device 1 performs steps S103 to S111, which are processes similar to those in steps S103 to S111 of the flowchart illustrated in FIG. 10, and thus the explanation thereof will not be repeated.

Figure 14:
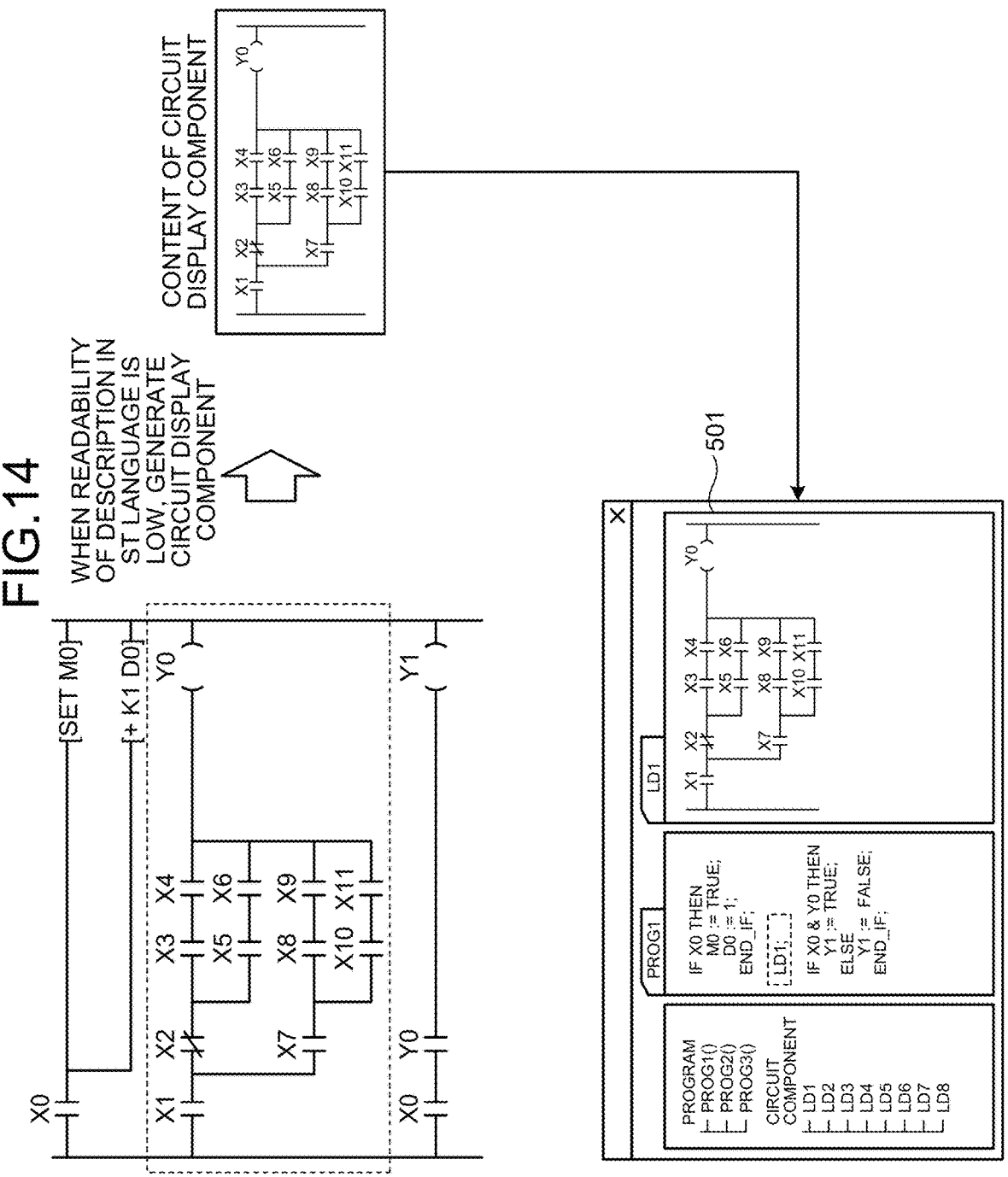
FIG. 14 is a diagram for explaining a method for displaying a circuit display component by the programming support device.

Next, specific examples of the method for displaying a circuit display component by the programming support device 1 will be explained. FIG. 14 is a diagram for explaining a method for displaying a circuit display component by the programming support device 1. As described above, when converting a ladder program into an ST program, the programming support device 1 generates a circuit display component if the condition for generation of a circuit display component is satisfied, that is, if it is determined that the readability is lowered by the conversion of a block of the ladder program in the ST program (description in the ST language). In addition, when displaying an ST program, if a circuit display component corresponding to a block in the ST program is present, the programming support device 1 performs the display in such a format that the user can recognize which block of the ST program the circuit display component corresponds to. Display of circuit display components with an ST program can prevent lowering of the readability in checking the ST program, and prevent lowering of the efficiency of work such as coding and debugging of the ST program. In the case of the example illustrated in FIG. 14, the display unit 5 of the programming support device 1 displays the ST program and a circuit display component 501 in different windows, and notifies the user of a part (block) of the ST program to which the displayed circuit display component 501 corresponds by enclosing the part with a broken line.

Figure 15:
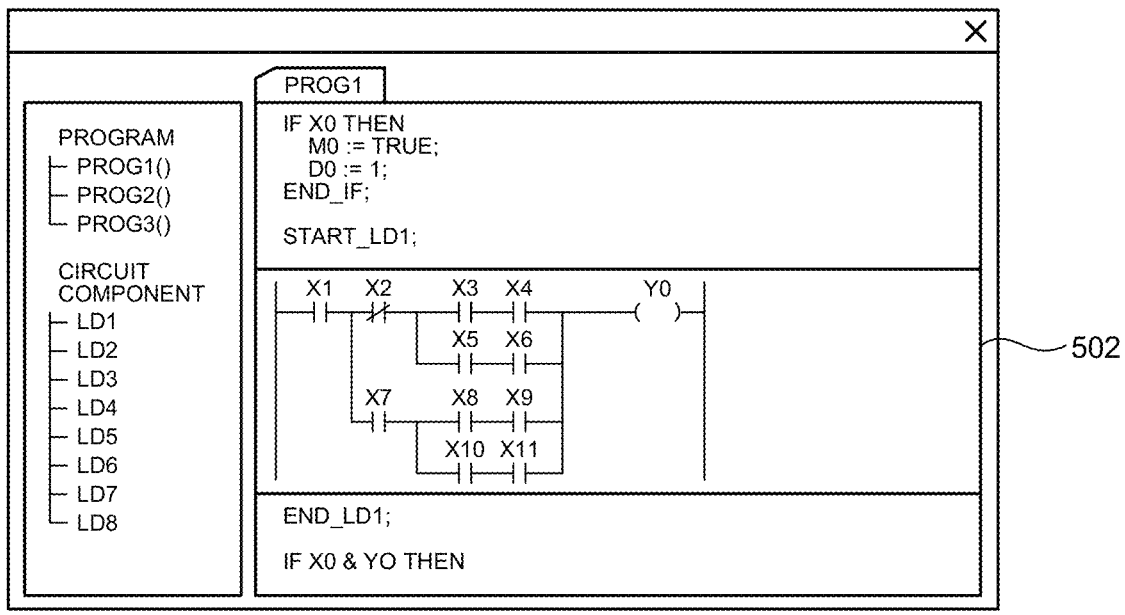
FIG. 15 is a diagram illustrating a second example of the method for displaying a circuit display component by the programming support device.
Figure 16:
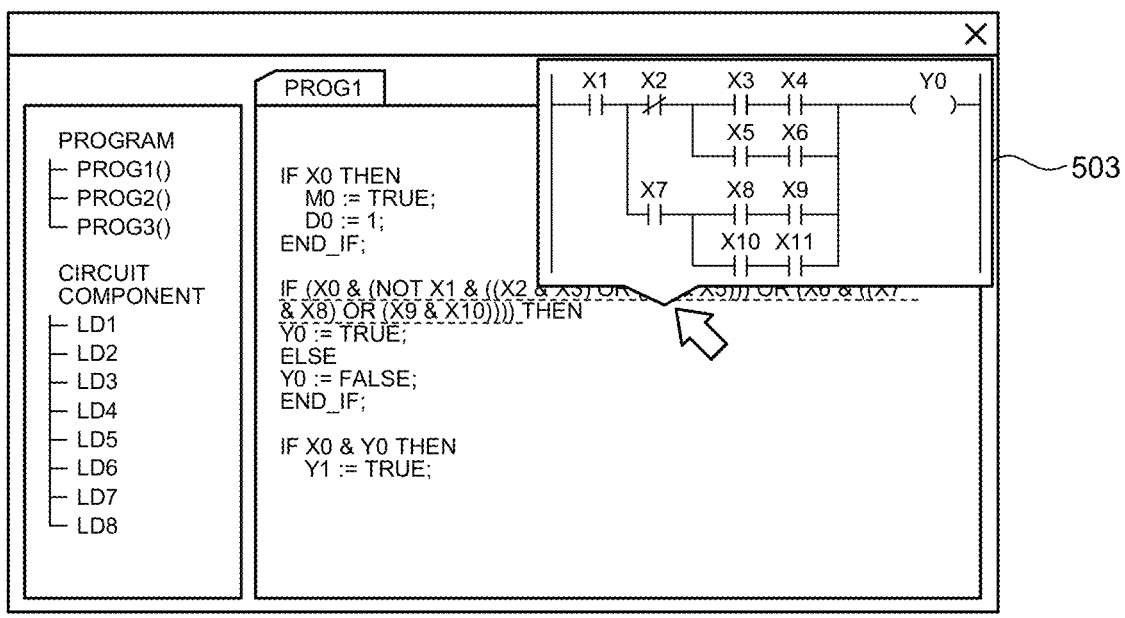
FIG. 16 is a diagram illustrating a third example of the method for displaying a circuit display component by the programming support device.

While the ST program and the circuit display component 501 are displayed in different windows in the display method illustrated in FIG. 14, other display methods as illustrated in FIG. 15 and FIG. 16 may be used. FIG. 15 is a diagram illustrating a second example of the method for displaying a circuit display component by the programming support device 1, and FIG. 16 is a diagram illustrating a third example of the method for displaying a circuit display component by the programming support device 1.

In the second example illustrated in FIG. 15, the display unit 5 of the programming support device 1 displays a circuit display components 502 together with an ST program at a corresponding position in the ST program. In the third example illustrated in FIG. 16, the display unit 5 of the programming support device 1 displays a circuit display component 503 over a corresponding position in an ST program in a speech bubble display. In the example illustrated in FIG. 16, the display unit 5 displays the circuit display component 503 if a circuit display component corresponding to the block of the ST program at the position of the cursor of a mouse is present when the cursor is on the ST program, for example. Alternatively, when one of the blocks of the ST program is selected by a mouse and the right mouse button is clicked, the display unit 5 may display the circuit display component 503 if the corresponding circuit display component is present.

Figure 17:
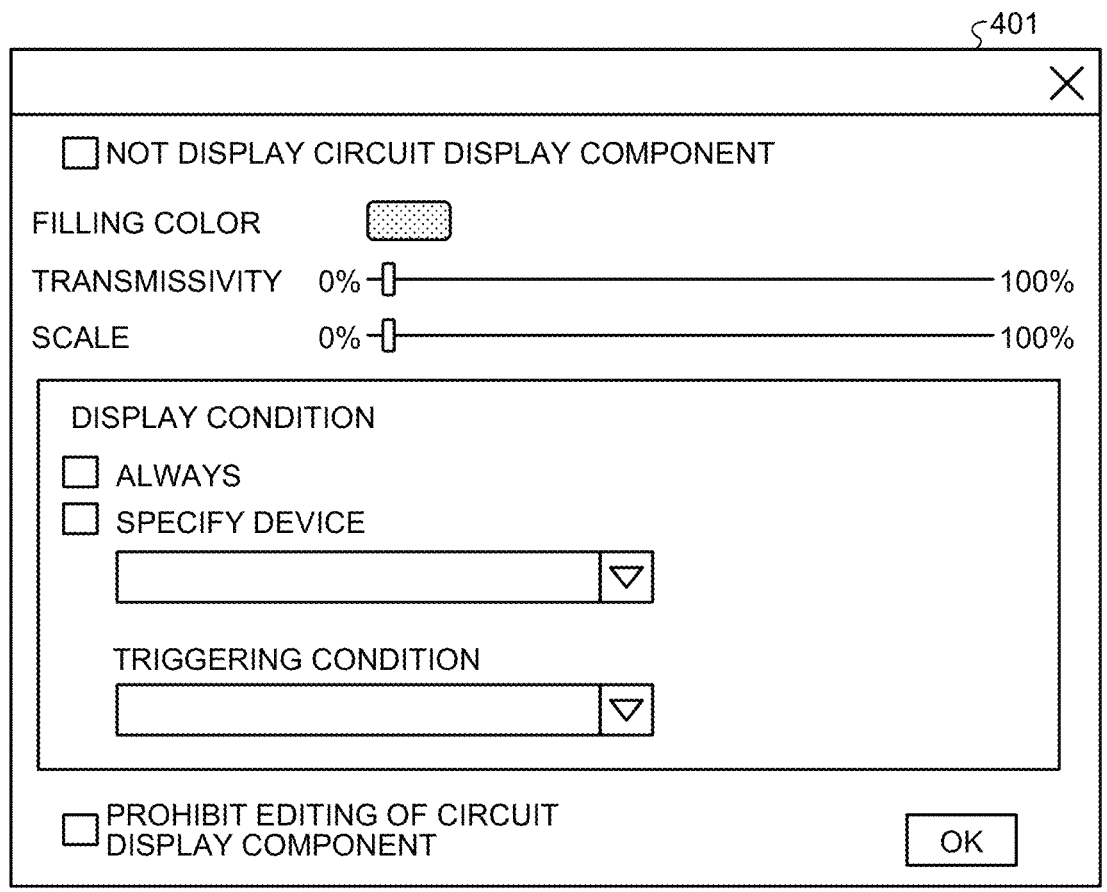
FIG. 17 is a diagram illustrating an example of a display attribute setting screen for a circuit display component.

In addition, the programming support device 1 has a function of receiving setting of display attributes of a circuit display component from the user. Setting of display attributes can be made for each circuit display component. FIG. 17 is a diagram illustrating an example of a display attribute setting screen for a circuit display component. When receiving setting of the display attributes of a circuit display component from the user, the programming support device 1 displays a display attribute setting screen 401 as illustrated in FIG. 17 on the display unit 5 and receives setting of the display attributes.

In the case of the display attribute setting screen 401, the user can set whether or not to display the circuit display component (NOT DISPLAY CIRCUIT DISPLAY COMPONENT), the color used to fill in display of the circuit display component (FILLING COLOR), the transmissivity of display of the circuit display component, the scale of display of the circuit display component, the condition for displaying the circuit display component (DISPLAY CONDITION), and whether or not to prohibit editing of the circuit display component (PROHIBIT EDITING OF CIRCUIT DISPLAY COMPONENT).

When the checkbox of "NOT DISPLAY CIRCUIT DISPLAY COMPONENT" on the display attribute setting screen 401 is checked, the programming support device 1 does not display the circuit display component together with the ST program when displaying the ST program.

Either one of the checkbox of "ALWAYS" and the checkbox of "SPECIFY DEVICE" in the display condition can be checked. When the checkbox of "ALWAYS" in the display condition is checked, the programming support device 1 always displays the corresponding circuit display component together with the ST program when displaying the ST program. When the checkbox of "SPECIFY DEVICE" in the display condition is checked, the programming support device 1 receives specification of a device and specification of a triggering condition, and always displays the corresponding circuit display components with the ST program if the specified device satisfies the specified triggering condition when displaying the ST program. Note that a device refers to a specific area in an internal memory of a programmable logic controller. "When a device satisfies a specified triggering condition" refers to "when data stored in a memory area indicated by a device satisfies a triggering condition". The programming support device 1 prompts the user to specify one of eight conditional expressions described in FIG. 18 as the triggering condition. FIG. 18 is a table illustrating an example of triggering conditions for displaying a circuit display component. The programming support device 1 may receive specification of a triggering condition different from those described in FIG. 18 from the user.

As described above, the programming support device 1 implemented by the programming support program according to the present embodiment has a function of converting each block of a ladder program into a ST program. In addition, when converting one block of a ladder program into an ST program, the programming support device 1 generates a circuit display component if a predetermined condition is satisfied. Specifically, when a predetermined condition (a condition for generation) is satisfied, the programming support device 1 determines that the readability of the ST program obtained by conversion lowers, and holds a block of the ladder program to be converted as a circuit display component. In addition, when displaying the ST program obtained by conversion, the programming support device 1 displays the circuit display component in association with the part where the readability is determined to be lowered. In addition, the programming support device 1 includes a machine learning device 82 that learns the conditions for generation of circuit display components, and determines whether or not to generate a circuit display component on the basis of the learned result. The programming support device 1 generates a circuit display component described in a ladder language with high readability for each of parts where the readability of an ST program is low, and displays the generated circuit display components together with the ST program when displaying the ST program, which can prevent lowering of the efficiency of work performed on the ST program obtained by conversion due to lowered readability resulting from conversion into the ST program.

The configurations presented in the embodiment above are examples of details, and can be combined with other known technologies or can be partly omitted or modified without departing from the scope thereof.

REFERENCE SIGNS LIST 1 programming support device; 2 ladder program data storage unit; 3 P code generating unit; 4 data manipulating unit; 5 display unit; 6 circuit display component storage unit; 7 ST program data storage unit; 8 ST program generating unit; 21 ladder program data; 71 ST program data; 80 circuit display component generating unit; 81 P code analyzing unit; 82 machine learning device; 83 ST template storage unit; 84 program converting unit; 100 electronic computer; 821 data obtaining unit; 822 state observing unit; 823 learning unit; 301 program-to-be-converted specification screen; 302 left arrow button; 303 right arrow button; 304 checkbox; 401 display attribute setting screen; 501 to 503 circuit display component.

The invention claimed is:

1. A non-transitory programming support program storage medium storing a programming support program, the programming support program causing a computer to perform a method comprising:
converting a first program described in a ladder language into a second program described in an intermediate language;
converting the second program into a third program described in a procedural language;
when a result of analysis of each block of the second program satisfies a predetermined condition, generating a block of the first program corresponding to a block satisfying the condition as a circuit display component to be displayed with the third program in display of the third program; and
displaying the third program and the circuit display component in a format enabling recognition of correspondence between the circuit display component and a block of the third program by overlaying the circuit display component on the third program in a window that includes a pointer pointing to the block of the third program.

2. The non-transitory programming support program storage medium according to claim 1, wherein the generating the block of the first program includes generating the circuit display component upon receiving an instruction from a user who checks the result of analysis.

3. The non-transitory programming support program storage medium according to claim 1, wherein the generating the block of the first program includes determining whether or not to generate the circuit display component by using a result of learning a condition for generation of the circuit display component by a machine learning device on a basis of data for learning including the result of analysis and a result of determination on whether or not generation of the circuit display component is necessary made by a user who checks the result of analysis.

4. The non-transitory programming support program storage medium according to claim 1, further comprising:

learning a condition for generation of the circuit display component on the basis of data for learning including the result of analysis and a result of determination on whether or not generation of the circuit display component is necessary to made by a user who checks the result of analysis, and the generating of the block of the first program includes determining whether or not to generate the circuit display component by using a result of learning in the machine learning.

5. The non-transitory programming support program storage medium according to claim 4, wherein the learning of the condition for generation of the circuit display component includes:

observing, as state variables, the number of conditions for executing one instruction, the number of instructions sharing one condition, and complexity of circuit configuration among information obtained by analyzing each block of the second program;

a obtaining, as training data, the result of determination on whether or not generation of the circuit display component is necessary to made by the user; and learning the condition for generation in accordance with data sets generated on the basis of combination of the state variables and the training data.

6. The non-transitory programming support program storage medium according to claim 4, wherein in a state in which learning of the condition for generation in the machine learning is not completed, the generating of the block of the first program determining whether or not to generate the circuit display component by using a condition for determining readability of the third program.

7. The non-transitory programming support program storage medium according to claim 1, wherein the circuit display component expresses a content of a block satisfying the condition in the ladder language.

8. The non-transitory programming support program storage medium according to claim 1, further comprising:

receiving an operation to change a content of a circuit display component generated in the circuit display component generation;

changing a circuit display component specified by a user in accordance with a content of the operation received in the data manipulating; and changing a corresponding part of the third program to conform with a content of the change in the circuit display component in the first changing.

9. The non-transitory programming support program storage medium according to claim 1, wherein in the display, a display attribute for displaying the circuit display component is settable by a user.

10. The non-transitory programming support program storage medium according to claim 9, wherein the display attribute includes a condition for displaying a circuit display component generated in the circuit display component generation, and a filling color, a transmissivity, and a scale of display of the circuit display component.

11. The non-transitory programming support program storage medium according to claim 10, wherein the condition for displaying the circuit display component generated in the circuit display component generation is capable of being specified by a user by using a prompt including a plurality of conditional expressions.

12. The non-transitory programming support program storage medium according to claim 1, wherein the window includes a speech bubble.

13. The non-transitory programming support program storage medium according to claim 1, further comprising displaying a user interface to receive a user input to cause the circuit display component to be generated regardless of whether the predetermined condition is satisfied.

14. The non-transitory programming support program storage medium according to claim 12, wherein the user interface further receives user input to cause the circuit display component to always be displayed when the third program is displayed.

15. A programming support device comprising:

a hardware processor configured to execute:

a first converter to convert a first program described in a ladder language into a second program described in an intermediate language;

a second converter to convert the second program into a third program described in a procedural language;

a circuit display component generator to, when a result of analysis of each block of the second program satisfies a predetermined condition, generate a block of the first program corresponding to a block satisfying the condition as a circuit display component to be displayed with the third program in display of the third program;

a circuit display component storage to hold the circuit display component; and a display to display the third program and the circuit display component held by the circuit display component storage in a format enabling recognition of correspondence between the circuit display component and a block of the third program by overlaying the circuit display component on the third program in a window that includes a pointer pointing to the block of the third program.

16. A programming support method performed by a programming support device used for development of a program, the method comprising:

a first conversion of converting a first program described in a ladder language into a second program described in an intermediate language;

a second conversion of converting the second program into a third program described in a procedural language;

a circuit display component generation of, when a result of analysis of each block of the second program satisfies a predetermined condition, generating a block of the first program corresponding to a block satisfying the condition as a circuit display component to be displayed with the third program in display of the third program; and a display of displaying the third program and the circuit display component in a format enabling recognition of correspondence between the circuit display component and a block of the third program by overlaying the circuit display component on the third program in a window that includes a pointer pointing to the block of the third program.

* * * * *